3,828,025
PHOSPHONO SUBSTITUTED ACYLPENICILLINS
Ernest S. Hamanaka, Groton, Conn., assignor to
Pfizer Inc., New York, N.Y.
No Drawing. Filed Nov. 4, 1970, Ser. No. 87,018
Int. Cl. C07d 99/16
U.S. Cl. 260—239.1    11 Claims

ABSTRACT OF THE DISCLOSURE

Broad spectrum antibacterial agents; namely, α-(phosphonoalkyl) and α-(ω-phosphonocycloalkyl)penicillins of the formula

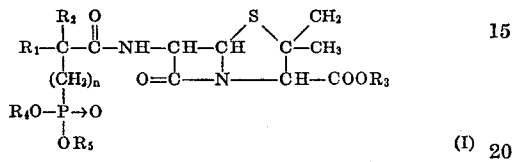

(I)

and the non-toxic cationic salts thereof wherein $R_1$ is hydrogen, lower alkyl, phenyl and substituted phenyl wherein the substituent is lower alkyl, lower alkoxy, chloro, bromo, fluoro and trifluoromethyl;

$R_2$ is hydrogen;

$R_1$ and $R_2$ together with the carbon atom to which they are attached are alicyclic of from 3 to 7 carbon atoms;

$R_3$ is hydrogen and acyloxy lower alkyl wherein the acyloxy moiety is lower alkanoyloxy, benzoyloxy and substituted benzoyloxy wherein the substituent is chloro, bromo, fluoro, lower alkyl, lower alkoxy and trifluoromethyl;

$n$ is 0 or an integer from 1 to 8;

each of $R_4$ and $R_5$ is hydrogen, lower alkyl, substituted lower alkyl wherein the substituent is lower alkoxy and fluoro; phenyl and substituted phenyl wherein the substituent is chloro, bromo, fluoro, lower alkyl, lower alkoxy and trifluoromethyl.

BACKGROUND OF THE INVENTION

This invention relates to a novel series of antibacterial agents and, more particularly, to α-(phosphonoalkyl) and α-(phosphonocycloalkyl)-penicillins, to the non-toxic cationic salts and esters thereof, and to methods for their preparation.

The term "penicillin" describes a group of acyl derivatives of 6-aminopenicillanic acid which differ only in the nature of the R group and possess the general formula II wherein the acyl moiety is derived from a carboxylic acid or functional derivative thereof such as an acyl chloride or anhydride.

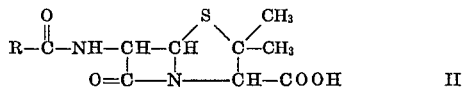

II

The properties, particularly the antibiotic properties, of a given penicillin are determined to a large extent by the R group. The best known and most widely used penicillins, benzyl penicillin, phenoxymethylpenicillin and, more recently, α-phenoxyethylpenicillin wherein R represents the benzyl-, phenoxymethyl- and α-phenoxyethyl- radicals, while highly antagonistic toward gram-positive microorganisms are far less effective against the so-called antibiotic resistant strains of bacteria, and of limited activity against gram-negative bacteria, important causes of severe infections and deaths in hospitals today and are readily destroyed by penicillinase. Therefore, drugs which will combat the continuing rise in Staphylococci incidence and a fatality and gram-negative infections, e.g., Pseudomonas, are of immeasurable value to the medical profession.

The situation has been improved by the recent introduction of α-aminobenzylpenicillin (U.S. 2,985,648, May 23, 1961) and α-carboxybenzylpenicillin (U.S. 3,142,673, July 28, 1964) as broad spectrum antibiotics of particular value against gram-negative infections via the parenteral route of administration.

Efforts to produce new penicillin antibiotics of greater efficacy have resulted in the preparation of a variety of other α-substituted acylpenicillins. Belgian Pat. 726,421, granted July 3, 1969, describes esters of a series of α - carboxyarylmethylpenicillins. Netherlands Specification 6,914,718, published Apr. 1, 1970, describes a large number of α-(sulfo)-alkylpenicillins and cationic salts thereof.

SUMMARY OF THE INVENTION

It has now been found that α-(phosphonoalkyl) and α-(phosphonocyclialkyl)penicillins of the formula

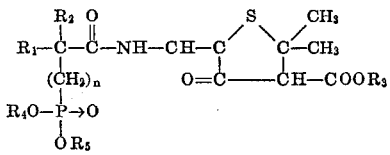

I and the non-toxic cationic salts thereof are effective antibacterial agents not only against gram-positive bacteria but against Pseudomonas. In the above formula $R_1$ is selected from the group consisting of hydrogen, lower alkyl, phenyl and substituted phenyl wherein the substituent is selected from the group consisting of lower alkyl, lower alkoxy, chloro, bromo, fluoro, and trifluoromethyl;

$R_2$ is hydrogen;

$R_1$ and $R_2$ together with the carbon to which they are attached are selected from the group consisting of alicyclic of from 3 to 7 carbon atoms;

$n$ is 0 or an integer from 1 to 8;

$R_3$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consisting of chloro, bromo, fluoro, lower alkyl, lower alkoxy and trifluoromethyl;

each of $R_4$ and $R_5$ is selected from the group consisting of hydrogen, lower alkyl, substituted lower alkyl wherein the substituent is selected from the group consisting of lower alkoxy and fluoro; phenyl and substituted phenyl wherein the substituent is selected from the group consisting of chloro, bromo, fluoro, lower alkoxy, lower alkyl and trifluoromethyl.

These novel compounds can exist in epimeric "D" and "L" forms. It will be convenient to refer to these epimers as the D- and L-epimers. Therefore, included within the purview of this invention are the D- and L-epimers and mixtures thereof of the compounds of formula I above, each of which exhibits substantial therapeutic activity.

Also included within the scope of this invention are the non-toxic cationic, e.g., the pharmaceutically-acceptable, salts of the novel compounds of formula I in which the carboxy and/or the phosphono groups are involved in salt formation. Salts such as the sodium, aluminum, potassium, calcium, magnesium, ammonium and substituted ammonium salts, e.g., procaine, dibenzylamino, N,N'-dibenzylethylenediamine, N,N' - bis(dehydroabietyl)ethylenediamine, 1-ephenamine, N-ethylpiperidine, N-benzyl-β-phenethylamine, triethylamine, as well as salts with other amines which have been used to form salts with benzylpenicillin are of significant activity against the antibiotic resistant Staphylococci and are useful for the preparation of pharmaceutically-elegant compositions of these valuable antibiotics.

The terms "lower alkyl" and "lower alkoxy" refer to alkyl and alkoxy groups having from 1 through 4 carbon atoms. While higher alkyl and alkoxy groups can be used, the "lower" groups are favored primarily because of availability of materials.

In addition to their unexpected and significant activity against the antibiotic resistant *Staphylococci* and against *Pseudomonas*, the novel products of this invention are resistant to destruction by penicillinase, the penicillin destroying enzyme elaborated by many micro-organisms, and are also antagonistic toward gram-positive micro-organisms.

The novel products of this invention are of value as antibacterial agents and are remarkably effective in treating a number of infections caused by susceptible gram-negative and gram-positive bacteria in poultry and animals including man. Several of the compounds exhibit resistance to penicillinase and are effective in treating infections due to resistant *Staphylococci*. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles, which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

DETAILED DESCRIPTION OF THE INVENTION

The novel and valuable compounds of the present invention are prepared from 6-aminopenicillanic acid by any of several known methods for introducing an acyl substituent into a primary amine. They can, for example, be prepared by the acylation, in a reaction-inert solvent, of 6-aminopenicillanic acid with a functional derivative of the carboxy group of the desired phosphonoalkanoic acid or phosphonocycloalkanoic carboxylic acid reactant,

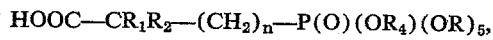

such as the corresponding acid chloride, bromide or anhydride, especially the mixed anhydride with other carboxylic acids such as ethoxy and isobutoxy carbonic acid, at a pH value of from about 6 to about 9 and at a temperature of from about 0° C. to about 50° C. The acylation can be conducted under a wide variety of conditions. It can, for example, be conducted in an aqueous reaction medium of an unstable emulsion of water and a water-immiscible organic solvent such as methyl isobutyl ketone and lower alkyl acetates over the pH range of about 2 to 4 and a temperature range of about 0° C. to 50° C. It can also be carried out over the pH range of from about 6 to 9 in aqueous solution (water or water acetone) at a temperature of from 0° C. to 50° C.

Alternatively, they can be prepared by the reaction of 6-aminopenicillanic acid with the appropriate acid reactant in the presence of a condensing agent, e.g., a carbodiimide such as 1,3-dicyclohexylcarbodiimide, or an alkoxyacetylene such as ethoxyacetylene. Additionally, the appropriate acid azide, or an active ester or thio ester of the carboxy moiety of the acid reactant with a phenol or thiophenol can be used as acylating agent. Further, the 6-aminopenicillanic acid can first be converted to a mono- or disilyl derivative by reaction with a trialkylsilyl halide or a trialkylsilylamine which is then acylated with an appropriate organic acid acylating agent (a carboxylic acid, acid anhydride or acid halide) and hydrolyzed to remove the protecting group (the "silyl" method)) as described in U.S. Pat. 3,249,633, issued May 3, 1966.

The phosphonoalkanoic acid or phosphonocycloalkanoic carboxylic acid reactant or functional derivative thereof can, when $R_4$ and/or $R_5$ is hydrogen, depending, of course, upon the pH of the reaction mixture, be used as the free acid or as an alkali metal or amine salt of the phosphonic acid group. When at least one of $R_4$ and $R_5$ is hydrogen, the tri(lower alkyl)amine salts, especially the triethylamine salt and the N-ethylpiperidinium salt, represent convenient forms of the phosphonoalkanoic or phosphonocycloalkanoic carboxylic acid reactant particularly when a mixed anhydride of the acid is used as acylating agent. Such salts are of definite value when the acylation is conducted in a non-aqueous system. In such instances, an amine salt, e.g., the triethylamine or N-ethylpiperidine salt, of the 6-aminopenicillanic acid serves as suitable form of the 6-aminopenicillanic acid. The acylation, when conducted in a non-aqueous system, is generally conducted at an initial temperature of as low as −40° C. during the combining of the reactants and is then gradually raised to room temperature or higher, e.g., about 50° C., if necessary.

In addition to the above purely chemical techniques of acylation, a sonochemical technique, that is, the application of vibrations of ultrasonic frequency (35,000 to 90,000 cycles per second), as described in U.S. Pat. 3,079,314, issued Feb. 26, 1963, can also be used to achieve acylation of 6-aminopenicillanic acid, especially acylation with an acid halide or anhydride. Acylation under such conditions is rapid and permissive of a wide range of reaction media, aqueous and non-aqueous alike, homogeneous and non-homogeneous, including emulsified systems.

Of the several known methods for acylating 6-aminopenicillanic acid cited above, the favored routes employ an acid halide or mixed anhydride of the appropriate phosphonoalkanoic or phosphonocycloalkanoic carboxylic acid reactant and an aqueous reaction media. The temperature range of from 0° C. to 50° C. and a pH range of from 6 to 9 are favored.

The esters of this invention, compounds of formula I wherein $R_3$ is acyloxy(lower alkyl), are prepared by reacting an alkali metal salt (sodium, potassium, lithium) or a tertiary lower alkyl amine salt (e.g., triethylamine) of the penicillins of formula I, wherein $R_3$ is hydrogen, with the appropriate acyloxy(lower alkyl)halide (chloride or bromide) of the formula $R_3$-halide. The reaction is normally conducted in a reaction-inert solvent such as tetrahydrofuran, dimethylformamide, dimethylsulfoxide or hexamethylphosphoramide. In practice, the halide is added, preferably dropwise, to a solution or suspension of an alkali metal or amine salt of the compound of formula I, wherein $R_3$ is hydrogen. At least one mole of the halide reactant is added per mole of penicillin compound, but in certain cases it may be advantageous to employ as much as a 50 percent excess. The reaction may be carried out at temperatures of from 0° C. to 50° C., with a preferred range of from 20° C. to 30° C. Reaction time will vary according to the temperature employed and the reactivity of the appropriate starting materials. Normally, the reaction period will range anywhere from one to twenty hours.

Upon completion of the reaction, the desired product is isolated by such standard means as by concentration of the reaction mixture. The residue is treated with acetone or methylene chloride to dissolve the penicillin compound and separate it from the inorganic salt by-product. Evaporation of the acetone or methylene chloride solvent, preferably in vacuo, provides the product, generally in a crude state of purity. Further purification of the desired product is achieved by conventional recrystallization techniques or by chromatographing over a polyamide resin such as Polyamide CC-6, a polycaprolactam distributed by Brinkman Instruments, Westbury, N.Y.

The acyloxy(lower alkyl) esters can also be prepared by the above-described acylation procedures but using the appropriate acyloxy(lower alkyl) 6-aminopencillanate in place of 6-aminopenicillanic acid or a salt thereof. The acyloxy(lower alkyl) 6-aminopenicillanates are prepared by reacting an alkali metal or amine salt of 6-aminopenicillanic acid with the appropriate chloro (or bromo) lower alkyl acyloxy reactant in a suitable solvent as is described above and by Daehne et al., J. Med. Chem. 13, 607–612 (1970).

The halides of the formula $R_3$-halide are synthesized from the corresponding acid chlorides and aldehydes or ketones in accordance with the general procedures of Ulich et al., J. Am. Chem. Soc. 43, 660 (1921) and Euranto et al., Acta. Chem. Scand. 20, 1273 (1966). The formation of esters from acid salts and alkyl halides is well-documented in the chemical literature (Zook and Wagner, "Synthetic Organic Chemistry," John Wiley and Sons, Inc., New York, 1956, p. 484).

The phosphonoalkanoic acid reactants,

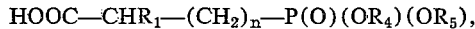
HOOC—CHR$_1$—(CH$_2$)$_n$—P(O)(OR$_4$)(OR$_5$), are prepared by the half-condensation of the appropriate alkylene bromide (or chloride), Br—(CH$_2$)$_n$—Br, with the sodio derivative of an ester of the appropriate malonic acid R$_1$CH(COOR)$_2$. The favored malonic acid esters are the methyl and ethyl esters. The ω-bromo-alkyl malonate thus prepared is then saponified and decarboxylated to the corresponding α-R$_1$-ω-bromoalkanoic acid R$_1$—CH(COOH)—(CH$_2$)$_n$—Br. The procedure used is that described by Salmon-Legagneur et al., Bull. Soc. Chim. France, 1263–70 (1956). The bromoalkanoic acid or an ester thereof is then reacted with a metal derivative (usually sodium) of the appropriate phosphite, (R$_4$O)(R$_5$O)POH, or with the appropriate tertiary phosphite. This latter reaction is convenient when the R$_4$ and R$_5$ moieties are identical. The reactions are conducted at a temperature of from about 25° C. to about 150° C. for several hours and with equimolar proportions of reactants. They are generally run in an organic solvent system such as a lower alkanol. The procedures used are essentially those of Nylen, Ber. 59, 1119–28 (1926) and of Arbuzov et al., J. Russ. Phys. Chem. Soc. 46, 295 (1914), respectively. These procedures are discussed by Kosolapoff in Chapter 7 of "Organophosphorous Compounds," John Wiley and Sons, Inc., New York, 1950.

The phosphonocycloalkane carboxylic acids are conveniently prepared from the precursor 1-bromo(or chloro)-1-cycloalkane carboxylic acid with the appropriate sodium phosphite as described above. The 1 - (ω - phosphonoalkyl)-1-cycloalkane carboxylic acids are prepared from the corresponding 1-carboalkoxymethyl-1-cycloalkane carboxylic acids by reacting it with one equivalent of silver nitrate to form an insoluble silver salt which is collected, dried and treated with bromine, usually in carbon tetrachloride or other suitable solvent. The 1-carbo(lower alkoxy)-1-bromomethylcycloalkane is then reacted with the appropriate sodium phosphite,

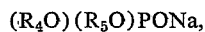
(R$_4$O)(R$_5$O)PONa, to give the 1-carbo(lower alkoxy)-1-phosphonomethyl-cycloalkane.

Homologous 1-carbo(lower alkoxy)-1-(ω-phosphonoalkyl)cycloalkanes are produced by alkylating a malonic acid diester, usually a lower alkyl diester, such as the diethyl ester, with the 1-carbo(lower alkoxy)-1-bromo-methylcycloalkane according to known procedures. The diethyl (1-carbomethoxycycloalkylmethyl)malonate is then saponified and decarboxylated to give a 1-carboxy-1-carboxyethylcycloalkane. Repetition of the procedure outlined produces a 1-carboxy-1-(ω-bromoalkyl)cycloalkane. This product is in turn converted to the next higher homolog by the above procedure. The bromoalkyl derivatives are also, of course, used to prepare the desired 1-carboxy-1 - (ω-phosphonoalkyl)cycloalkanes. The sequence is repeated until the acid having the desired chain length

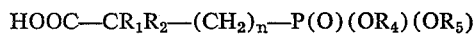
HOOC—CR$_1$R$_2$—(CH$_2$)$_n$—P(O)(OR$_4$)(OR$_5$)

is obtained.

The novel penicillins of this invention can also be prepared by reaction of the appropriate halo(bromo or chloro)alkyl or halocycloalkylpenicillin wherein the acyl moiety has the formula Br—(CH$_2$)$_n$—CR$_1$R$_2$—CO— with the appropriate sodium posphite according to the procedure describe dabove. Many of the required haloalkylpenicillins are described in the art (U.S. 3,071,575; British 888,110). These and others having the abovementioned acyl moiety are prepared by acylating 6-aminopenicillanic acid with an acid chloride or anhydride of a haloalkanoic acid of the formula

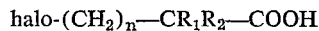
halo-(CH$_2$)$_n$—CR$_1$R$_2$—COOH according to procedures well known in the art and described herein.

The novel penicillins described herein exhibit in vitro activity against a wide variety of micro-organisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

The oral and parenteral dosage levels for the herein described compounds are, in general, on the order of up to 200 mg./kg. and 100 mg./kg. of the body weight per day, respectively.

Many of the penicillin ester compounds of this inveniton exhibit improved absorption on oral administration over that produced by the corresponding free acid or alkali metal salt forms. They, therefore, represent convenient and effective dosage forms of the (phosphonoalkyl) and (phosphonocycloalkyl)penicillins of formula I above.

Further, many of the esters described herein, although inactive or of relatively low activity against gram-negative organisms per se are, when administered orally to animals, including man, metabolized to the parent acid, which has a wide spectrum of activity against gram-positive and gram-negative bacteria. They thus serve as pro-drug forms of the parent compounds since they are biologically converted in vivo to said compounds. The metabolic conversion of such esters to the parent acid occurs at such a rate as to provide an effective and prolonged concentration of the parent acid in the animal body. In effect, such esters act as depot sources for the parent acid. Especially useful in this respect are those compounds wherein the R$_3$ moiety of the ester group is —CH$_2$—O—COR$_6$ wherein R$_6$ is phenyl or lower alkyl, especially branched-chain lower alkyl such as t-butyl and 3-pentyl.

The antimicrobial spectra of α-(O-ethylphosphono)benzylpenicillin disodium salt and α-phosphonobenzylpenicillin disodium salt against several bacteria are presented below. The tests were run under standardized conditions in which nutrient broth containing various concentrations of the test material was seeded with the particular organism specified, and the minimum growth (MIC) at which growth of each organism failed to occur was observed and recorded.

TABLE I

*In vitro data of α-(O-ethylphosphono)benzyl- and α-Phosphonobenzyl penicillin disodium salts (MIC; mcg./ml.)*

| | Benzylpenicillin | |
|---|---|---|
| Organism | α-(O-ethyl-phosphono)- MIC | α-Phosphono- MIC |
| Staphylococcus aureus | 50 | 100 |
| Streptococcus pyogenes | 12.5 | 12.0 |
| Pasteurella multocida | 1.56 | 25 |
| Erysipelothrix insidiosa | 3.12 | 0.75 |
| Salmonella choleraesuis | 200 | >208 |
| Aerobacter aerogenes | >200 | >200 |
| Hemophilus influenzae | >200 | >200 |
| Klebsiella pneumoniae | >200 | >200 |
| Pseudomonas aeruginosa | 6.25 | 50 |
| Escherichia coli | 200 | >200 |
| Proteus mirabilis | 100 | >200 |

Table II presents *in vivo* data for α-(O-ethylphosphono)benzylpenicillin disodium salt against experimental *E. coli* and *S. aureus* infections in mice. The values (survivors/total number of infected mice) are obtained under standard conditions known to those skilled in the art. The test compound is administered to the infected mice by a multiple dosing regimen in which the first dose is given 0.5 hour after inoculation and is repeated four and twenty-four hours later.

TABLE II

*In vivo data for α-(O-ethylphosphono) benzylpenicillin Disodium salt vs. bacterial infections in mice\**

| | E. coli | | Staph. aureus | |
|---|---|---|---|---|
| Dose (mg./kg.) | PO | SQ | PO | SQ |
| 200 | 1/10 | 0/10 | 2/10 | 4/10 |
| 100 | 1/10 | 0/10 | 2/10 | 3/10 |

*PO = Oral; SQ = Subcutaneous route of administration. Ratio of survivors/total mice.

Also effective as antibacterial agents are analogs of formula I compounds wherein R₃ is $$-C(R_7)(R_8)-O-CO-W$$

in which R₇ is hydrogen and R₈ is selected from the group consisting of alkyl, alkoxyalkyl and alkylthioalkyl each containing up to 6 carbon atoms, cycloalkyl of from 3 to 6 carbon atoms, phenylalkyl and mono- and disubstituted phenylalkyl wherein said substituent is selected from the group consisting of alkyl containing up to 3 carbon atoms, chlorine, bromine, fluorine and alkoxy and alkylthio each containing up to 2 carbon atoms, alkyl, alkoxyalkyl and alkylthioalkyl each containing up to 6 carbon atoms, cycloalkyl of from 3 to 6 carbon atoms;

R₇ and R₈ when taken together with the carbon atom to which they are attached form a ring system of the formula

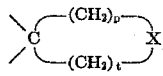

wherein X is selected from the group consisting of CH₂, O and S and *p* and *t* are each integers of from 1 to 3;

W is selected from the group consisting of cycloalkyl of from 3 to 8 carbon atoms, phenylalkyl and mono- and and disubstituted phenylalkyl wherein said alkyl portion consists of 1 to 3 carbon atoms and said substituents are each chosen from the group consisting of chloro, bromo, fluoro, lower alkoxy, lower alkylthio, lower alkanoylamino, lower alkyl, trifluoromethyl and N,N-di(n-propyl)sulfamyl; phenyl and mono- and disubstituted phenyl wherein the substituents are chosen from the group consisting of lower alkyl, lower alkoxy, chloro, bromo, fluoro and trifluoromethyl.

Additionally, compounds of formula I wherein R₁ is thienyl, pyridyl, phenoxy or substituted phenoxy wherein the substituent is at least one of chloro, bromo, lower alkyl, lower alkoxy and trifluoromethyl are valuable antibacterial agents. Such compounds have the same utility and are used in substantially the same manner as are compounds of formula I. They are, of course, prepared by methods well known to those skilled in the art from appropriate reactants, which in turn are prepared by standard methods.

Amide derivatives of the compounds of formula I wherein the OR₃ group of the carboxy moiety is replaced by —NR'R" are also efficient and valuable antibacterial agents. The R' and R" variables are selected from the group consisting of hydrogen, lower alkyl, cycloalkyl, phenyl, substituted phenyl wherein the substituent is selected from the group consisting of lower alkyl, lower alkoxy, chloro, bromo, di(lower alkyl)amino, trifluoromethyl and carbo(lower alkoxy); 5- and 6- membered heterocyclic rings containing at least one of the hetero atoms N, O or sulfur, such as 2-pyridinyl, 2-thiazolyl, 2-pyrryl, 4-imidazolyl, 2-oxazolyl, 2-pyrimidinyl, 5-(1,2,4-triazolyl); fused 5- and 6- membered heterocyclic rings containing at least one N, O or S atoms, e.g., 2-benzothiazolyl, 2-quinolyl and 2-indolyl.

Still further, analogs of compounds of formula I wherein one or more of the oxygen atoms of the phosphono moiety is replaced by sulfur are also effective broad spectrum antibacterial agents. Such compounds are prepared by methods presented herein but using the appropriate thio analog of the phosphonoalkanoic acid reactant.

Compounds analogous to those of formula I but wherein the OR₅ group is replaced by R₅' to give the group —P(O)R₅'(OR₄) wherein R₅' is R₅ and —NR'R", said groups being defined above, are also effective antibacterial agents. Such compounds are prepared by procedures described above for making compounds of formula I. The requisite phosphonoalkanoic and phosphonocycloalkanoic carboxylic acid reactants $$HOOC-CR_1R_2-(CH_2)_n-P(O)R_5'(OR_4)$$

are prepared by methods presented above for the analogous reactants but using the appropriate primary phosphonic acid or ester thereof R₅'P(OR₄)₂ in place of the tertiary phosphite. Such methods are discussed generally by Kosolapoff (*loc. cit.*).

EXAMPLE I

α-Phosphonobenzylpenicillin (via the acid anhydride)

A mixture of the triethylamine salt of 6-aminopenicillanic acid (0.864 g.) and dry methylene chloride is cooled to —20° C. The triethylamine salt of the anhydride of α-phosphonophenylacetic acid with ethyl carbonate (1.15 g.) is added and, after fifteen minutes, the mixture transferred to a wet ice bath. It is stirred for one hour, the ice bath removed and stirring continued for 2.5 hours. Concentration of the mixture under reduced pressure gives a yellow foam. The foam is taken up in methylene chloride (20 ml.), two equivalents of sodium 2-ethyl hexanoate added and the disodium salt which precipitates recovered by filtration. It is purified by recrystallization from acetone-water.

The anhydride of α-phosphonophenylacetic acid with ethyl carbonate is prepared by treating α-phosphonophenylacetic acid (0.01 mole) in dry acetone (20 ml.) was two equivalents of triethylamine. The solution is cooled to —20° C. and ethyl chloroformate (7.8 mM) added. The mixture is transferred to a 0° C. bath, stirred for two hours and filtered. The filtrate is concentrated and the residue dissolved in methylene chloride.

The acid form of the product is obtained by acidfying an aqueous solution of the disodium salt to pH about 1.2 to 2.0 and extracting the acid solution with n-butanol. The acid form is recovered by lyophilization.

EXAMPLE II

α-Phosphonobenzylpenicillin (via the acid chloride)

A mixture of freshly distilled thionyl chloride (2.32 ml., 0.032 mole), α-phosphonophenylacetic acid (0.8604 g., 4 mM.) and ether (2.0 ml.) is stirred under an atmosphere of nitrogen for seven hours and then concentrated under reduced pressure. Ethylene dichloride (5.0 ml.) is added to the residue and the resulting solution taken to dryness. This step is repeated three times.

The α-phosphonophenylacetyl chloride thus produced is dissolved in dry methylene chloride (1.5 ml.) and cooled to −70° C. A mixture of the triethylamine salt of 6-aminopenicillanic acid (1.141 g., 3.6 mM.), dry methylene chloride (10 ml.) and triethylamine (1.12 ml., 8.0 mM.) is added and the reaction mixture stirred for ten minutes. The cooling bath is removed and the mixture allowed to stand overnight at room temperature. A large volume of ether is added to precipitate the product as a gum. The ether is decanted and methylene chloride:ether (70 ml. of a 4:1 solution) added to the residue. The mixture is thoroughly shaken and the methylene chloride:ether solution filtered. Ethyl acetate (50 ml.) is added to the filtrate and the resulting precipitate filtered and dried. It is taken up in methylene chloride (75 ml.), methanol (10 ml.) and sodium 2-ethyl hexanoate (2 equivalents) in dry methyl isobutyl ketone added. The disodium salt is filtered and dried. It is purified by recrystallization from acetone:water.

EXAMPLE III

α-Phosphonobenzylpenicillin (acylation in aqueous emulsion)

An aqueous solution of 6-aminopenicillanic acid (50 mM./ml.) at room temperature is adjusted to pH 2 with hydrochloric acid then converted with one-half volume of methyl isobutyl ketone. The mixture is stirred vigorously then α-triethylammoniumphosphonylphenylacetyl chloride (described below) added. Sodium hydroxide is added to the reaction mixture as necessary to maintain the pH at 2. After one hours, the reaction mixture, an emulsion, is filtered and the organic phase separated. The organic solution is centrifuged then dried ($Na_2SO_4$), and filtered. Sodium 2-ethyl hexanoate (0.11 mole) in dry methyl isobutyl ketone is added to the filtrate to give the disodium salt of α-phosphonobenzylpenicillin.

Repetition of this procedure but using ethyl acetate as solvent and pH values of 2 and 4 produces the same product.

The α-triethylammoniumphosphonylphenylacetyl chloride is prepared by treating α-phosphonophenylacetic acid (0.01 mole) in dry methylene chloride (20 ml.) with two equivaletns of triethylamine and the solution cooled to −20° C. Thionyl chloride (10 percent excess) is added, the mixture transferred to a 0° C. bath, stirred for two hour sand concentrated in vacuo.

EXAMPLE IV

α-Phosphonobenzylpenicillin (via carbodiimide condensing agent)

To a solution of α-phosphonophenylacetic acid (10.8 g.) in 40 ml. of tetrahydrofuran there is added 10.3 g. of 1,3-dicyclohexylcabodiimide in 35 ml. of tetrahydrofuran followed by a solution of 6-aminopenicillanic acid (10.8 g.) in 300 ml. of water:tetrahydrofuran (1:1) containing sufficent sodium bicarbonate to give a pH of 7.8. The mixture is stirred at room temperature for two hours, then filtered to remove 1,3-dicyclohexylurea. The filtrate is diluted to 1000 ml. with cold water, the aqueous layer adjusted to pH 2.8 with phosphoric acid and extracted with 2× 200 ml. of cold nitromethane. The combined nitromethane extracts are washed with $1/10$ volume of water and then extracted at pH 7.5 with one-half volume of water. The aqueous layer is washed with ether and lyophilized to give the sodium salt of α-phosphonobenzylpenicillin.

EXAMPLE V

O-(Ethylphosphono)benzylpenicillin (via the "Silyl method")

A suspension of hexamethyl disilazane (50 ml.) and 6-aminopenicillanic acid (21.6 g.) is heated under reflux at 80° C. for four hours and then at 120° C. for one-half hour while passing a stream of nitrogen through the mixture. Excess hexamethyl disilazane is removed by distillation in vacuo to leave a mixture of 6-aminopenicillanic acid trimethyl silyl ester and N-trimethyl silyl 6-aminopenicillanic acid trimethyl silyl ester as a viscous oil. The residue is taken up in sufficient volume of dry tetrahydrofuran to provide 100 ml. of solution (Example 6 of U.S. Pat. 3,249,622).

To 30 ml. of the solution thus obtained (equivalent to 6.48 g., 0.03 mole of 6-aminopenicillanic acid) is added triethylamine (3.64 g.). A solution of α-(O-ethylphosphono)phenylacetyl chloride (8.1 g.) in tetrahydrofuran (20 ml.) is added dropwise at 0°–5° C. with stirring. The mixture is allowed to stand for three hours, then poured into ethyl acetate (500 ml.) and cooled to 0°–5° C. Isopropanol (5 ml.) is added and, after one hour, the mixture filtered. A solution of sodium 2-ethyl hexanoate in ethyl acetate is added to the filtrate to provide a pH of 7.5. The sodium salt of the title compound is recovered by evaporation of the solvent in vacuo or by addition of a large volume of ether.

The use of α-phosphonophenylacetyl chloride in place of α(O-ethylphosphono)phenylacetyl chloride in this procedure produces α-phosphonobenzylpenicillin.

EXAMPLE VI

β-Phosphonoethylpenicillin

A. Via the "Silyl" Method.—The mixed anhydride of β - phosphonopropionic acid with ethyl carbonate 3.7 g. (prepared according to the procedure of Example I from β-phosphonopropionic acid) in benzene (20 ml.) is added to 15 ml. of a solution of silylated 6-aminopenicillanic acid (prepared as described in Example V but dissolved in benzene rather than tetrahydrofuran). The reaction mixture is stirred for four hours then added to a vigorously stirred solution of sodium bicarbonate (7.5 g.) in water (300 ml.). After thoroughly mixing, the benzene layer is separated. n-Butanol (75 ml.) is added to the aqueous solution which is then acidified to pH 1–2. The mixture is vigorously agitated, the n-butanol phase separated and the aqueous layer extracted with n-butanol (2× 50 ml.). The combined n-butanol extracts are dried over anhydrous sodium sulfate and filtered. Potassium 2-ethyl hexanoate in butanol is added and the dipotassium salt of the title compound recovered by evaporation.

B. Via the Acid Chloride.—Triethylamine (2.02 ml.) is added to a stirred solution of β-phosphonopropionic acid (0.75 g.) in dry methylene chloride (20 ml.) under nitrogen. The clear solution which forms is evaporated under reduced pressure. Ethylene dichloride (10 ml.) is added and the solvent evaporated off. This step is repeated twice to insure a complete water-free product. The residue is taken up in ethylene dichloride (20 ml.) and triethylamine (0.67 ml.) added. The solution is cooled to 0° C., thionyl chloride (0.35 ml.) added and the reaction mixture stirred for 1.5 hours. It is then evaporated to dryness. Ethylene dichloride (10 ml.) is added to the residue and the solvent evaporated off. This step is repeated twice to insure a thionyl chloride-free product. The dry residue is dissolved in methylene chloride (10 ml.).

Five ml. of the methylene chloride solution (0.0024 mole of β-phosphono(triethylammonium)propionyl chloride) is added over a three-minute period to the triethylamine salt of 6-aminopenicillanic acid (0.76 g.) in methylene chloride (20 ml.) at −70° C. under nitrogen. The mixture is stirred at −70° C. for one-half hour and at room temperature for fifteen minutes. It is evaporated to dryness in vacuo, the residue triturated with acetone, the triethylamine hydrochloride filtered off and the acetone solution evaporated. Ethyl acetate (25 ml.) is added followed by sodium 2-ethyl hexanoate (0.08 g.) and acetone (25 ml.). The white solid—the disodium salt—is collected and dried under nitrogen.

C. Via the Mixed Anhydride Method.—The mixed anhydride of β-phosphonopropionic acid with ethyl carbonate as its triethylamine salt (Example VI-A, 1.31 g.), is added all at once to a suspension of the triethylamine salt of 6-aminopenicillanic acid (1.265 g.) in methylene chloride at −70° C. After ten minutes, the mixture is allowed to warm to 0° C. and stirred for one-half hour. The mixture is evaporated in vacuo without the application of heat, and the residue taken up in acetone (30 ml.). Sodium 2-ethyl hexanoate (0.80 g.) is added and the white precipitate which forms collected and dried.

EXAMPLE VII

Following the methods of the preceding examples, the products listed below are prepared from appropriate reactants:

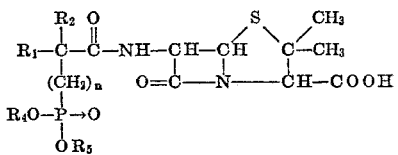

| $R_1$ | $R_2$ | $R_4$ | $R_5$ | $n$ | Method |
|---|---|---|---|---|---|
| H | H | $C_2H_5$ | H | 0 | II |
| H | H | $C_2H_5$ | $C_2H_5$ | 0 | II |
| H | H | i-$C_4H_9$ | i-$C_4H_9$ | 0 | II |
| H | H | n-$C_4H_9$ | n-$C_4H_9$ | 0 | I |
| H | H | n-$C_4H_9$ | H | 0 | I |
| $CH_3$ | H | $C_2H_5$ | $C_2H_5$ | 0 | I |
| $CH_3$ | H | $C_2H_5$ | H | 0 | I |
| $C_2H_5$ | H | $C_2H_5$ | $C_2H_5$ | 0 | V |
| $C_2H_5$ | H | H | $C_2H_5$ | 0 | V |
| n-$C_4H_9$ | H | H | H | 0 | II |
| n-$C_4H_9$ | H | $C_2H_5$ | $C_2H_5$ | 0 | II |
| H | H | $C_2H_5$ | $CH_3$ | 1 | III |
| H | H | $C_2H_5$ | $C_2H_5$ | 1 | I |
| H | H | i-$C_4H_9$ | i-$C_4H_9$ | 2 | II |
| H | H | sec-$C_4H_9$ | sec-$C_4H_9$ | 2 | II |
| H | H | H | H | 6 | II |
| H | H | H | H | 7 | II |
| H | H | $C_2H_5$ | $C_2H_5$ | 4 | I |
| H | H | $C_2H_5$ | $C_2H_5$ | 6 | II |
| H | H | $C_4H_9$ | $C_4H_9$ | 8 | II |
| $CH_3$ | H | $CH_3$ | H | 1 | II |
| $CH_3$ | H | i-$C_3H_7$ | i-$C_3H_7$ | 1 | II |
| n-$C_4H_9$ | H | $CH_3$ | $CH_3$ | 1 | II |
| n-$C_4H_9$ | H | n-$C_4H$ | H | 1 | II |
| n-$C_4H_9$ | H | $CH_3$ | $CH_3$ | 2 | II |
| $C_3H_5$ | H | n-$C_3H_7$ | n-$C_3H_7$ | 3 | II |
| $CH_3$ | H | $C_2H_5$ | $C_2H_5$ | 5 | II |
| $CH_3$ | H | $CH_3$ | $CH_3$ | 6 | II |
| $C_3H_7$ | H | $CH_3$ | $CH_3$ | 7 | II |
| H | H | $FCH_2CH_2$ | $FCH_2CH_2$ | 0 | II |
| H | H | $FCH_2CH_2$ | $FCH_2CH_2$ | 1 | II |
| H | H | $FCH_2CH_2$ | $FCH_2CH_2$ | 4 | II |
| H | H | $FCH_2CH_2$ | $FCH_2CH_2$ | 8 | II |
| H | H | $CH_3OCH_2CH_2$ | $CH_3OCH_2CH_2$ | 0 | III |
| H | H | $CH_3OCH_2CH_2$ | $CH_3OCH_2CH_2$ | 3 | III |
| H | H | $C_2H_5OCH_2CH_2$ | $C_2H_5OCH_2CH_2$ | 6 | III |
| H | H | $C_4H_9OCH_2CH_2$ | $C_4H_9OCH_2CH_2$ | 0 | III |
| H | H | $C_4H_9OCH_2CH_2$ | H | 0 | III |
| H | H | $CH_3O(CH_2)_4$— | $CH_3O(CH_2)_4$— | 0 | III |
| $C_2H_5$ | H | $FCH_2CH_2$ | H | 2 | II |
| $CH_3$ | H | $CH_3OCH_2CH_2$ | H | 3 | II |
| $C_2H_5$ | H | $CH_3O(CH_2)_3$ | $CH_3O(CH_2)_3$ | 2 | II |
| H | H | $C_6H_5$ | $C_6H_5$ | 0 | IV |
| H | H | $C_6H_5$ | H | 0 | IV |
| H | H | $C_6H_5$ | $C_6H_5$ | 1 | IV |
| H | H | $C_6H_5$ | $C_6H_5$ | 4 | IV |
| H | H | $C_6H_5$ | $C_6H_5$ | 8 | IV |
| $CH_3$ | H | $C_6H_5$ | $C_6H_5$ | 1 | IV |
| $C_2H_7$ | H | $C_6H_5$ | $C_6H_5$ | 2 | IV |
| $CH_3$ | H | $C_6H_5$ | H | 4 | IV |
| H | H | 4-$ClC_6H_4$ | 4-$ClC_6H_4$ | 0 | V |
| H | H | 4-$ClC_6H_4$ | 4-$ClC_6H_4$ | 1 | V |
| H | H | 4-$ClC_6H_4$ | 4-$ClC_6H_4$ | 3 | V |
| H | H | 4-$ClC_6H_4$ | 4-$ClC_6H_4$ | 5 | V |
| H | H | 4-$ClC_6H_4$ | H | 1 | V |
| $CH_3$ | H | 4-$ClC_6H_4$ | H | 1 | V |
| $C_2H_5$ | H | 4-$ClC_6H_4$ | H | 1 | V |

TABLE—Continued

| $R_1$ | $R_2$ | $R_4$ | $R_5$ | $n$ | Method |
|---|---|---|---|---|---|
| H | H | o-Tolyl | o-Tolyl | 0 | V |
| H | H | ----do---- | ----do---- | 1 | V |
| $CH_3$ | H | ----do---- | ----do---- | 3 | V |
| H | H | ----do---- | ----do---- | 6 | V |
| H | H | ----do---- | H | 0 | II |
| $C_2H_5$ | H | ----do---- | H | 3 | II |
| H | H | m-Tolyl | m-Tolyl | 0 | V |
| $C_2H_5$ | H | ----do---- | ----do---- | 0 | V |
| $C_2H_5$ | H | ----do---- | H | 1 | V |
| H | H | p-Tolyl | p-Tolyl | 0 | V |
| H | H | ----do---- | ----do---- | 1 | V |
| $CH_3$ | H | ----do---- | ----do---- | 4 | V |
| H | H | 4-t-$C_4H_9 \cdot C_6H_4$ | 4-t-$C_4H_9 \cdot C_6H_4$ | 0 | III |
| H | H | 4-t-$C_4H_9 \cdot C_6H_4$ | 4-t-$C_4H_9 \cdot C_6H_4$ | 1 | III |
| H | H | 4-t-$C_4H_9 \cdot C_6H_4$ | 4-t-$C_4H_9 \cdot C_6H_4$ | 2 | III |
| H | H | 2-$CH_3OC_6H_4$ | 2-$CH_3OC_6H_4$ | 0 | III |
| H | H | 2-$CH_3OC_6H_4$ | 2-$CH_3OC_6H_4$ | 2 | III |
| $CH_3$ | H | 2-$CH_3OC_6H_4$ | 2-$CH_3OC_6H_4$ | 2 | III |
| $C_3H_7$ | H | 2-$CH_3OC_6H_4$ | 2-$CH_3OC_6H_4$ | 2 | III |
| $C_3H_7$ | H | 2-$CH_3OC_6H_4$ | 2-$CH_3OC_6H_4$ | 6 | III |
| $C_6H_5$ | H | H | H | 0 | II |
| $C_6H_5$ | H | H | H | 1 | II |
| $C_6H_5$ | H | H | H | 3 | II |
| H | H | H | H | 3 | II |
| H | H | $CH_3$ | $CH_3$ | 0 | II |
| H | H | $C_2H_5$ | $C_2H_5$ | 1 | II |
| H | H | $C_6H_5$ | $C_6H_5$ | 0 | II |
| H | H | $C_6H_5$ | H | 1 | II |
| 2-$CH_3C_6H_4$ | H | H | H | 0 | II |
| 2-$CH_3C_6H_4$ | H | $CH_3$ | $CH_3$ | 2 | II |
| 2-$CH_3C_6H_4$ | H | n-$C_4H_9$ | n-$C_4H_9$ | 2 | II |
| 2-$CH_3C_6H_4$ | H | H | H | 8 | II |
| 2-$CH_3C_6H_4$ | H | $C_2H_5$ | $C_2H_5$ | 0 | II |
| 2-$CH_3C_6H_4$ | H | $C_2H_5$ | $C_2H_5$ | 2 | II |
| 2-$CH_3C_6H_4$ | H | $CH_3OCH_2CH_2$ | $CH_3OCH_2CH_2$ | 4 | II |
| 2-$ClC_6H_4$ | H | H | H | 0 | II |
| 2-$ClC_6H_4$ | H | H | H | 1 | II |
| 2-$ClC_6H_4$ | H | H | H | 3 | II |
| 2-$ClC_6H_4$ | H | $CH_3$ | $CH_3$ | 2 | II |
| 2-$ClC_6H_4$ | H | $C_6H_5$ | $C_6H_5$ | 0 | II |
| 4-$ClC_6H_4$ | H | $CH_3OCH_2CH_2$ | H | 0 | II |
| 4-$ClC_6H_4$ | H | $CH_3OCH_2CH_2$ | H | 1 | II |
| 4-$ClC_6H_4$ | H | $CH_3OCH_2CH_2$ | H | 6 | II |
| 2-$BrC_6H_4$ | H | H | H | 0 | V |
| 4-$FC_6H_4$ | H | H | H | 5 | V |
| 4-$FC_6H_4$ | H | $C_4H_9$ | H | 1 | I |
| 4-$FC_6H_4$ | H | 4-$ClC_6H_4$ | 4-$ClC_6H_4$ | 2 | I |
| 4-$CH_3OC_6H_4$ | H | H | H | 0 | I |
| 4-$CH_3OC_6H_4$ | H | $C_2H_5$ | $C_2H_5$ | 0 | III |
| 4-$CH_3OC_6H_4$ | H | o-Tolyl | o-Tolyl | 1 | III |
| 3-$C_2H_5OC_6H_4$ | H | $CH_3$ | $CH_3$ | 0 | III |
| 3-$C_2H_5OC_6H_4$ | H | $CH_3$ | $CH_3$ | 1 | III |
| 2-$CF_3C_6H_4$ | H | $CH_3$ | $CH_3$ | 0 | III |
| $C_6H_5$ | H | $CH_3$ | $CH_3$ | 2 | II |
| $C_6H_5$ | H | $C_6H_5$ | $C_6H_5$ | 4 | II |
| $C_6H_5$ | H | 2-$CH_3OC_6H_4$ | 2-$CH_3OC_6H_4$ | 1 | II |
| 2-$CH_3C_6H_4$ | H | $C_2H_5$ | $C_2H_5$ | 3 | II |
| 2-$CH_3C_6H_4$ | H | $C_2H_5$ | $C_2H_5$ | 5 | II |
| 3-$CH_3C_6H_4$ | H | $C_6H_5$ | $C_6H_5$ | 1 | II |
| 3-$CH_3C_6H_4$ | H | $C_4H_9$ | $C_4H_9$ | 4 | II |
| $C_6H_5$ | H | $C_2H_5$ | $C_2H_5$ | 4 | II |
| $C_6H_5$ | H | H | H | 4 | II |
| $C_6H_5$ | H | H | H | 4 | II |
| 3-$CH_3C_6H_4$ | H | $C_4H_9$ | $C_4H_9$ | 6 | II |
| 4-$CH_3C_6H_4$ | H | $CH_3$ | $CH_3$ | 1 | II |
| 4-$CH_3C_6H_4$ | H | H | H | 3 | II |
| 4-$CH_3C_6H_4$ | H | $C_6H_5$ | $C_6H_5$ | 5 | II |
| 4-$CH_3C_6H_4$ | H | $C_2H_5$ | $C_2H_5$ | 8 | II |
| 3-$C_2H_5C_6H_4$ | H | p-Tolyl | p-Tolyl | 1 | I |
| 3-$C_2H_5C_6H_4$ | H | ----do---- | ----do---- | 4 | I |
| 4-i-$C_3H_7C_6H_4$ | H | $CH_3$ | $CH_3$ | 1 | III |
| 4-i-$C_3H_7C_6H_4$ | H | $CH_3$ | $CH_3$ | 4 | III |
| 4-i-$C_3H_7C_6H_4$ | H | $CH_3$ | $CH_3$ | 6 | III |
| 2-n-$C_4H_9C_6H_4$ | H | $C_2H_5$ | $C_2H_5$ | 1 | V |
| 3-n-$C_4H_9C_6H_4$ | H | $C_2H_5$ | $C_2H_5$ | 1 | V |
| 4-t-$C_4H_9C_6H_4$ | H | $C_2H_5$ | $C_2H_5$ | 1 | II |
| 2-$CH_3OC_6H_4$ | H | $C_6H_5$ | $C_6H_5$ | 0 | II |
| 2-$CH_3OC_6H_4$ | H | $C_6H_5$ | $C_6H_5$ | 1 | III |
| 3-$CF_3C_6H_4$ | H | $C_6H_5$ | $C_6H_5$ | 4 | I |
| 4-$CH_3OC_6H_4$ | H | $C_2H_5$ | $C_2H_5$ | 7 | I |
| 2-$CF_3C_6H_4$ | H | $CH_3$ | $CH_3$ | 8 | I |

EXAMPLE VIII

α-Phosponocyclohexylpenicillin

To 1-phosphono-1-carboxycyclohexane (0.94 g.) in methylene chloride (20 ml.) is added triethylamine (1.3 ml.) and the resulting solution cooled to 0° C. Thionyl chloride (0.32 ml.) is added, the solution stirred for one hour and evaporated to dryness. The residue, the triethylammonium salt of 1-phosphono-1-chlorocarbonylcyclohexane, is dissolved in methylene chloride (10 ml.) and added dropwise over a five-minute period to a mixture of triethylammonium 6-aminopenicillanic acid (1.42 g.) and triethylamine (0.6 ml.) in dry methylene chloride at −70° C. under an atmosphere of nitrogen.

The mixture is stirred for one-half hour at −70° C. and at room temperature for one-half hour. It is then evaporated to dryness under reduced pressure and the residue triturated with acetone. The acetone solution is evaporated to give the di-triethylammonium salt of the title product. It is converted to the disodium salt by dissolving in the minimum volume of acetone and treating the solution with sodium 2-ethyl hexanoate (1.28 g.) in ethyl acetate. The mixture is stirred for fifteen minutes, the light tan precipitate filtered under nitrogen, washed with methylene chloride and dried.

Repetition of this procedure but using the 1-carboxy-1-(ω-phosphonoalkyl)cycloalkanes of Preparations F and G in place of 1-phosphono-1-carboxy-cyclohexane produces the following compounds as their disodium salts:

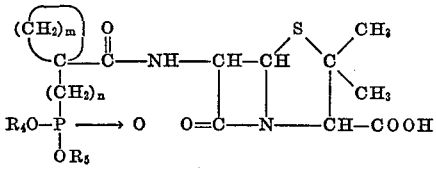

| m | n | $R_4$ | $R_5$ |
|---|---|---|---|
| 2 | 0 | H | H |
| 2 | 1 | H | H |
| 2 | 4 | H | H |
| 2 | 8 | H | H |
| 2 | 0 | $C_2H_5$ | $C_2H_5$ |
| 2 | 0 | $CH_3OCH_2CH_2$ | $CH_3OCH_2CH_2$ |
| 2 | 1 | $C_6H_5$ | $C_6H_5$ |
| 2 | 1 | p-Tolyl | H |
| 3 | 0 | H | H |
| 3 | 1 | H | H |
| 3 | 6 | H | H |
| 3 | 0 | $CH_3$ | $CH_3$ |
| 3 | 0 | n-$C_4H_9$ | n-$C_4H_9$ |
| 3 | 0 | 2-Cl$C_6H_4$ | 2-Cl$C_6H_4$ |
| 3 | 1 | 2-$CH_3OC_6H_4$ | H |
| 3 | 3 | $CH_3$ | H |
| 3 | 8 | H | H |
| 4 | 0 | H | H |
| 4 | 1 | H | H |
| 4 | 3 | H | H |
| 4 | 3 | $CH_3$ | $CH_3$ |
| 4 | 3 | $C_6H_5$ | $C_6H_5$ |
| 4 | 0 | $CH_3OCH_2CH_2$ | $CH_3OCH_2CH_2$ |
| 4 | 4 | $CH_3OCH_2CH_2$ | $CH_3OCH_2CH_2$ |
| 5 | 0 | H | H |
| 5 | 1 | H | H |
| 5 | 5 | H | H |
| 5 | 0 | i-$C_4H_9$ | i-$C_4H_9$ |
| 5 | 1 | o-Tolyl | o-Tolyl |
| 5 | 0 | 4-Cl$C_6H_4$ | 4-Cl$C_6H_4$ |
| 6 | 0 | H | H |
| 6 | 0 | $C_2H_5$ | $C_2H_5$ |
| 6 | 0 | p-Tolyl | p-Tolyl |
| 6 | 0 | 2-$CH_3OC_6H_4$ | 2-$CH_3OC_6H_4$ |
| 6 | 1 | $CH_3$ | $CH_3$ |
| 6 | 3 | $CH_3$ | $CH_3$ |
| 6 | 6 | $C_6H_5$ | $C_6H_5$ |

EXAMPLE IX

Acetoxymethyl α-Phosphonobenzylpenicillinate Monosodium Salt

To 35 ml. of dry dimethylformamide contained in a 125 ml. three-necked flask, under a nitrogen atmosphere, is added 5.45 g. (0.0119 mole) of disodium α-phosphonobenzylpenicillin followed after ten minutes by the dropwise addition of 1.40 g. (0.0129 mole) of chloromethyl acetate. The reaction mixture is allowed to remain at room temperature overnight. The dimethylformamide is evaporated in vacuo and the residue taken up in acetone. The sodium chloride is removed by filtration and the filtrate evaporated in vacuo to provide the crude product.

The crude product is purified by chromatography on Polyamide CC-6 with ethyl acetate. The first fraction (125 ml.) is concentrated in vacuo to provide the product as an oil.

EXAMPLE X

Pivaloyloxymethyl-α-Phosphonobenzylpenicillinate

A. Triethylamine (0.004 mole) is added to pivaloyloxymethyl 6-aminopenicillanate (0.004 mole) in methylene chloride (25 ml.) and the mixture cooled to −70° C. α-Triethylammoniumphosphonophenylacetyl chloride (0.004 mole) is added and the mixture stirred at −70° C. for one-half hour followed by one hour at room temperature. It is evaporated in vacuo to a gum which is triturated with acetone and filtered. The filtrate is evaporated, the residue taken up in acetone (10 ml.) and sodium 2-ethyl hexanoate (one equivalent) added. The mixture is concentrated, treated with hexane-benzene (10–1) to precipitate the monosodium salt of the title product as a white solid.

This procedure is repeated but using the appropriate ester of 6-aminopenicillanic acid to produce acyloxymethyl α-phosphonobenzylpenicillinates wherein the acyloxymethyl group is:

acetoxymethyl  
propionoxymethyl  
isobutyryloxymethyl  
benzoyloxymethyl  
α-ethyl-n-butyryloxymethyl  
n-butyryloxymethyl B. Disodium α-phosphonobenzylpenicillin (1 mM.) is dissolved in N,N-dimethylformamide (2 ml.) and chloromethyl pivalate (1.32 mM.) added. The solution is stirred overnight at room temperature then evaporated in vacuo. The residue is dissolved in acetone, the sodium chloride filtered, and the acetone solution concentrated. Trituration of the residue with ether-hexane (1:1) gives the ester as a white powder.

C. Pivaloyloxymethyl 6-aminopenicillanate (1.08 g.) is acylated with the mixed anhydride of ethylcarbonate with α-phosphonobenzylpenicillin as its triethylamine salt (1.27 g.) in methylene chloride (25 ml.) at −70° C. The mixture is stirred for ten minutes then allowed to come to 0° C. After a half-hour, it is allowed to reach room temperature. Sodium 2-ethyl hexanoate (0.54 g.) is added and the mixture evaporated in vacuo. The yellow gummy residue is stirred with benzene-hexane (1:10) and the white precipitate which forms collected and dried.

EXAMPLE XI

The penicillin compounds of Examples I, V, VI and the title compound of Example VIII are converted to the 3-acyloxy lower alkyl esters shown below by the procedure of Example IX. The ester groups have the formula:

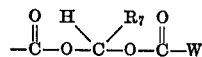

| $R_7$ | W |
|---|---|
| H | $C(CH_3)_3$ |
| H | $CH_3$ |
| H | $C_6H_5$ |
| $CH_3$ | $CH_3$ |
| $CH_3$ | $C(CH_3)_3$ |
| $C_3H_7$ | $CH_3$ |
| H | $CH(C_2H_5)_2$ |
| $C_2H_5$ | $C_2H_5$ |
| H | $2(CH_3)C_6H_4$ |
| H | $CH_3$ |
| H | $4\text{-}ClC_6H_4$ |
| H | $C_3H_7$ |
| H | $4\text{-}(CF_3)C_6H_4$ |
| H | $4\text{-}BrC_6H_4$ |
| H | $4\text{-}FC_6H_4$ |
| $CH_3$ | $2\text{-}CH_3OC_6H_4$ |
| $CH_3$ | $4\text{-}(t\text{-}C_4H_9)C_6H_4$ |

EXAMPLE XII

The products of Examples VII and VIII are converted to acyloxy lower alkyl esters of the 3-carboxy group by the procedure of Example IX. The following esters are thus prepared wherein the ester group is

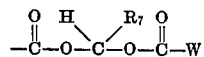

| $R_7$: | W |
|---|---|
| H | $C(CH_3)_3$ |
| H | $CH_3$ |
| H | $C_6H_5$ |
| $C_2H_5$ | $C_2H_5$ |

EXAMPLE XIII

The salts of the penicillin products of Examples I, V through XII are transformed to their acid forms by careful neutralization of aqueous solutions thereof with Dowex 50, acid form (a strong cation exchange sulfonated polystyrene resin available from The Dow Chemical Co.) and evaporated, after filtration, to give the free acids.

EXAMPLE XIV

The free acids of the preceding examples are transformed to their mono-sodium, calcium, magnesium, ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with one equivalent of the appropriate base. The salts are recovered by freeze drying.

EXAMPLE XV

The free acids of Example XIII are converted to their di-sodium, potassium, calcium, magnesium ammonium, procaine, N,N'-dibenzylethylenediamine, N-ethylpiperidine, dibenzylamine, 1-ephenamine, triethylamine, N-benzyl-β-phenethylamine, N,N'-bis(dehydroabietyl)ethylenediamine and benzhydrylamine salts by reaction of aqueous solutions thereof with two equivalents of the appropriate base. The salts are recovered by freeze drying.

EXAMPLE XVI

A tablet base is prepared by blending the following ingredients in the proportion by weight indicated.

| | |
|---|---|
| Sucrose, U.S.P. | 80.0 |
| Tapioca starch | 12.5 |
| Magnesium stearate | 7.5 |

Sufficient α-phosphonobenzylpenicillin disodium salt is blended into the base to provide tablets containing 25, 100 and 250 mg. of active ingredient.

EXAMPLE XVII

Capsules containing 25, 100 and 250 mg. of active ingredient are prepared by blending pivaloyloxymethyl α-(O-ethylphosphono)benzylpenicillinate in the following mixture (proportions given in parts by weight).

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XVIII

A suspension of α-phosphonocyclohexylpenicillin is prepared with the following composition:

| | | |
|---|---|---|
| Penicillin compound | g | 31.42 |
| 70% Aqueous sorbitol | g | 714.29 |
| Glycerine, U.S.P. | g | 185.35 |
| Gum acacia (10% solution) | ml | 100.00 |
| Polyvinyl pyrrolidone | g | 0.50 |
| Propyl parahydroxybenzoate | g | 0.172 |
| Distilled water to make one liter | g | 0.094 |

Various sweetening and flavoring agents may be added to this suspension, as well as acceptable coloring. The suspension contains approximately 25 mg. of penicillin compound per milliliter.

EXAMPLE XIX

A parenteral form of α-phenyl-β-phosphonoethylpenicillin is prepared by dissolving an intimate mixture of the disodium salt of the penicillin compound and sodium citrate (4 percent by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

PREPARATION A

Diethyl Aryl Malonates

The folowing aryl malonic acids are prepared by the method of Wallingford et al., J. Am. Chem. Soc. 63, 2056–2059 (1964) which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture.

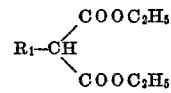

$R_1$:

| | |
|---|---|
| 2-methoxyphenyl | 3-isopropylphenyl |
| 3-methoxyphenyl | 2-n-butylphenyl |
| 4-methoxyphenyl | 3-ethoxyphenyl |
| 2-trifluoromethylphenyl * | 2-n-butoxyphenyl |
| 3-trifluoromethylphenyl | 4-n-butoxyphenyl |
| 4-trifluoromethylphenyl | 4-t-butylphenyl |
| 2-isopropylphenyl | |

The diethyl arylmalonates thus produced are hydrolyzed and decarboxylated by the methods of Preparation B to give the corresponding arylacetic acids.

PREPARATION B

2-Phenyl-6-Bromo-n-Caproic Acid

Metallic sodium (0.25 mole) is dissolved in absolute ethanol (80 ml.) and to the mixture diethyl phenylmalonate (0.5 mole) added. Pentamethylene bromide (0.25 mole) is added, the mixture stirred and then kept at 0° C. for two hours. The product is taken up in water and ether, the ethereal solution separated, washed with water, dried ($Na_2SO_4$) and evaporated. The residue is fractionally distilled in vacuo to give diethyl 6-bromohexylphenylmalonate.

A mixture of diethyl 6-bromohexylphenylmalonate and 48 percent aqueous hydrobromic acid (4 ml./g. of ester) is refluxed under nitrogen until carbon dioxide is no longer evolved. The mixture is cooled and extracted with ether several times. The extract is washed with aqueous sodium sulfate and dried over anhydrous sodium sulfate. The 2-phenyl-6-bromo-n-caproic acid is recovered by evaporation.

Repetition of this procedure, but using the appropriate diethylarylmalonate and alkylene bromide reactants produces the following compounds:

$$R_1-CH-COOH$$
$$|$$
$$(CH_2)_n$$
$$|$$
$$Br$$

| $R_1$: | $n$ |
|---|---|
| Phenyl | 1 |
| Phenyl | 2 |
| Phenyl | 4 |
| Phenyl | 6 |
| Phenyl | 7 |
| Phenyl | 8 |
| 2-chlorophenyl | 1 |
| 2-chlorophenyl | 2 |
| 2-chlorophenyl | 3 |
| 2-chlorophenyl | 6 |

*The necessary o-trifluoromethylphenylacetic acid is prepared from o-trifluoromethylbenzonitrile by the procedure of Corse et al., J. Am. Chem. Soc. 70, 2841 (1948) which comprises: (a) conversion of the nitrile to o-trifluoromethylacetophenone by a Grignard reaction with methylmagnesium iodide followed by hydrolysis; (b) reaction of the acetophenone with sulfur and morpholino at 135° C. for 16 hours followed by treatment with glacial acetic acid and hydrochloric acid.

TABLE—Continued

| $R_1$: | $n$ |
|---|---|
| 2-chlorophenyl | 8 |
| 3-chlorophenyl | 1 |
| 3-chlorophenyl | 2 |
| 3-chlorophenyl | 5 |
| 3-chlorophenyl | 8 |
| 4-chlorophenyl | 1 |
| 4-chlorophenyl | 2 |
| 4-chlorophenyl | 3 |
| 4-chlorophenyl | 4 |
| 4-chlorophenyl | 8 |
| 2-bromophenyl | 1 |
| 2-bromophenyl | 2 |
| 2-bromophenyl | 4 |
| 2-bromo-phenyl | 6 |
| 3-bromophenyl | 1 |
| 3-bromophenyl | 3 |
| 3-bromophenyl | 7 |
| 4-bromophenyl | 1 |
| 4-bromophenyl | 2 |
| 4-bromophenyl | 3 |
| 4-bromophenyl | 6 |
| 2-methylphenyl | 1 |
| 2-methylphenyl | 2 |
| 2-methylphenyl | 3 |
| 2-methylphenyl | 5 |
| 2-methylphenyl | 8 |
| 3-methylphenyl | 1 |
| 3-methylphenyl | 4 |
| 3-methylphenyl | 6 |
| 4-methylphenyl | 1 |
| 4-methylphenyl | 3 |
| 4-methylphenyl | 5 |
| 4-methylphenyl | 8 |
| 2-ethylphenyl | 1 |
| 4-ethylphenyl | 3 |
| 3-ethylphenyl | 1 |
| 3-ethylphenyl | 4 |
| 4-isopropylphenyl | 1 |
| 4-isopropylphenyl | 2 |
| 4-isopropylphenyl | 4 |
| 4-isopropylphenyl | 6 |
| 2-n-butylphenyl | 1 |
| 2-n-butylphenyl | 3 |
| 2-n-butylphenyl | 5 |
| 2-n-butylphenyl | 8 |
| 3-n-butylphenyl | 1 |
| 3-n-butylphenyl | 4 |
| 4-n-butylphenyl | 1 |
| 4-n-butylphenyl | 3 |
| 4-t-butylphenyl | 1 |
| 4-t-butylphenyl | 3 |
| 4-t-butylhpenyl | 8 |
| 2-methoxyphenyl | 1 |
| 2-methoxyphenyl | 3 |
| 2-methoxyphenyl | 4 |
| 2-methoxyphenyl | 6 |
| 3-ethoxyphenyl | 1 |
| 3-ethoxyphenyl | 2 |
| 3-ethoxyphenyl | 5 |
| 2-methoxyphenyl | 8 |
| 4-methoxyphenyl | 3 |
| 4-methoxyphenyl | 7 |
| 2-n-butoxyphenyl | 1 |
| 2-n-butoxyphenyl | 4 |
| 4-n-butoxyphenyl | 1 |
| 4-n-butoxyphenyl | 8 |
| 2-$(CF_3)$phenyl | 1 |
| 2-$(CF_3)$-phenyl | 2 |
| 2-$(CF_3)$phenyl | 8 |
| 3-$(CF_3)$phenyl | 1 |
| 3-$(CF_3)$phenyl | 4 |
| 4-$(CF_3)$phenyl | 1 |
| 4-$(CF_3)$phenyl | 3 |
| 4-$(CF_3)$phenyl | 8 |

In the preparation of those products wherein $R_1$ is lower alkoxyphenyl, the diethyl ω-bromoalkyl[(lower alkoxy)phenyl]malonates are saponified with one equivalent of sodium hydroxide in water at room temperature until neutral. The reaction mixture is then carefully acidified to form the half-ester half-acid which is then extracted with ether. The residue obtained by evaporation of the ethereal solution is heated at 100°–150° C. to bring about decarboxylation. The resulting 2-[(lower alkoxy)phenyl]-ω-bromalkanoic acid ethyl ester is saponified with one equivalent of aqueous sodium hydroxide to the corresponding sodium salt. Acidification and extraction of the mixture with ether provide the acid evaporation of the ether.

PREPARATION C

2-Phenyl-6-(O,O-Diethylphosphono)-n-Caproic Acid

Diethylphosphite (0.25 mole) and sodium (0.25 mole) are reacted together in hexane (125 ml.) with good stirring at gentle reflux. To the resulting solution is added 6-bromo-2-phenyl-n-caproic acid sodium salt dropwise over a three-hour period. The mixture is then refluxed for four hours and allowed to stand overnight at room temperature. The sodium bromide is removed by filtration through filter acid and the filtrate evaporated under reduced pressure.

The residue is taken up in ether and the solution shaken thoroughly with water containing one equivalent of hydrogen chloride. The ether solution is separated, washed with water and dried ($Na_2SO_4$). Removal of the ether gives the title product.

The remaining products of Preparation B and those of D, E and F are likewise converted to the appropriate phosphono acid derivatives.

PREPARATION D

1-Carboxy-1-Bromomethylcyclobutane

A. 1 - Carbomethoxy-1-carboxymethylcyclobutane.—1-Carboxy-1-carboxymethylcyclobutane (5 g.) in methanol (25 ml.) containing concentrated sulfuric acid (0.5 ml.) is refluxed for three hours. The mixture is cooled and poured into a saturated aqueous solution of sodium bicarbonate. The aqueous solution is extracted with ether, the ethereal solution dried ($Na_2SO_4$) and evaporated to provide 1-carbomethoxy - 1 - carbomethoxymethylcyclobutane.

A solution of the dimethyl ester (3.0 g.) in methanol (20 ml.) is added to a solution of one equivalent of potassium hydroxide in water (8 ml.). After standing for thirty-six hours, the methanol is removed under reduced pressure and the residue diluted with water (15 ml.) and extracted with ether. The aqueous phase is acidified to pH 2 with 6N hydrochloric acid and extracted with ethyl acetate. The extract is dried ($Na_2SO_4$) and evaporated to provide the mono ester: 1-carbomethoxy-1-carboxymethylcyclobutane.

B. 1-Carbomethoxy - 1 - bromomethylcyclobutane.—1-Carbomethoxy-1-carboxymethylcyclobutane (2.0 g.) is dissolved in one equivalent of 0.2N potassium hydroxide and one equivalent of silver nitrate in water is added. The silver salt which precipitates is filtered off, washed successively with water, methanol, acetone and ether, and dried at 90° C. and 20 mm. pressure for twelve hours. The salt is suspended in dry carbon tetrachloride (5 ml.), bromine (one equivalent) in carbon tetrachloride (1 ml.) added and the mixture refluxed for two hours. The precipitated silver bromine is filtered, the filtrate washed with 5 percent aqueous sodium carbonate, then dried ($Na_2SO_4$) and concentrated to give the product.

In like manner, the homologous 1-carboxy-1-bromomethylcycloalkanes wherein the cycloalkane moiety is cyclopropane, cyclopentane, cyclohexane and cycloheptane are prepared from the appropriate 1-carboxy-1-carboxymethylcycloalkane.

PREPARATION E

1-Carboxy-1-(2-Bromoethyl)Cyclobutane

A. Diethyl(1 - carbomethoxycyclobutylmethyl)malonate.—Diethyl malonate is alkylated with 1-carbomethoxy-1-bromomethylcyclobutane as follows:

Diethyl malonate (1.65 g.) is added slowly to a solution of sodium ethoxide (1 equivalent) in absolute ethanol (20 ml.) at 50° C. To the clear solution is then added 1-carbomethoxy - 1 - bromomethylcyclobutane (2.0 g.) dropwise so as to avoid the need for cooling the mixture. The mixture is refluxed for two hours, the alcohol distilled off and the residue treated with water (25 ml.) and shaken thoroughly. The ester layer is separated and distilled *in vacuo*.

B. 1-Carboxy - 1 - carboxyethylcyclobutane.—The ester product of (A) above (2.9 g.) is added slowly to a gently refluxing solution of potassium hydroxide (2.25 g.) in water (10 ml.). The mixture is refluxed for an additional two hours then diluted with an equal volume of water and the alcohol distilled from the solution.

The aqueous solution is cooled, acidified with 9N aqueous sulfuric acid and refluxed for two hours. It is then cooled and extracted with ether. The ethereal extract is dried ($Na_2SO_4$) and evaporated to give the product.

It is then converted to 1-carboxy - 1 - (2 - bromoethyl)cyclobutane by the procedure of Preparation D.

PREPARATION F

The following compounds are prepared by repetition of the procedures of Preparations D and E from appropriate reactants. The procedure comprises the reaction sequence outlined below for increasing the chain length of the bromoalkyl chain.

$$(CH_2)_m\begin{matrix}CH_2CH_2Br\\COOCH_3\end{matrix} \longrightarrow (CH_2)_m\begin{matrix}CH_2CH_2CH(COOC_2H_5)_2\\COOCH_3\end{matrix}$$

$$(CH_2)_m\begin{matrix}CH_2CH_2CH_2Br\\COOCH_3\end{matrix} \longleftarrow (CH_2)_m\begin{matrix}CH_2CH_2CH_2COOH\\COOH\end{matrix}$$

The following compounds are thus prepared:

$$(CH_2)_m\begin{matrix}(CH_2)_nBr\\COOH\end{matrix}$$

| m: | n |
|---|---|
| 2 | 0,1,4,8 |
| 3 | 0,1,3,6,8 |
| 4 | 0,1,3,4 |
| 5 | 0,1,5 |
| 6 | 0,1,3,6 |

PREPARATION G

Phosphonoalkanoic Acids and Phosphonocycloalkane Carboxylic Acids

The phosphono acid compounds of formula I described herein are prepared by acylating 6-aminopenicillanic acid with the appropriate phosphonoalkanoic acid or phosphonocycloalkane carboxylic acid $$HOOC-CR_1R_2-(CH_2)_n-PO(OH)_2$$

These acids are prepared by hydrolysis of an ester of the phosphono acid. The general procedure comprises refluxing the appropriate ester, $$HOOC-CR_1R_2-(CH_2)_n-PO(OR_4)(OR_5)$$

with concentrated hydrochloric or hydrobromic acid for several hours (e.g., 10 to 40 hours). The reaction mixture is cooled, diluted with an equal volume of water and concentrated under reduced pressure. This process is repeated several times to remove all the acid. The residue is the desired phosphono acid.

In the case of those esters wherein $R_1$ contains an alkoxy group, the hydrolysis is conducted with dilute acid in a closed tube at 125° C. to 150° C. Alternatively, aqueous alkali is used.

PREPARATION H

Partial Hydrolysis of Phosphono Acid Diesters

The phosphonoalkanoic acids and phosphonocycloalkane carboxylic acids $$HOOC-CR_1R_2-(CH_2)_n-PO(OR_4)(OR_5)$$

wherein only one of $R_4$ or $R_5$ is hydrogen are prepared by treating a diester with excess 10 percent aqueous sodium hydroxide at reflux for a period of from about four to about twelve hours. A molar ratio of diester to sodium hydroxide of about 1:5 to about 1:7 is convenient. The reaction mixture is cooled and treated with Dowex 50 (a strong cation exchange resin, a sulfonated polystyrene, available from the Dow Chemical Company, Midland, Mich.) to a pH of about 1.5 to 2.0. The mixture is filtered and the product recovered by standard methods; e.g., organic solvent extraction followed by removal of the solvent, by evaporation of the aqueous filtrate if water soluble.

What is claimed is:

1. A compound of the formula $$\begin{matrix} R_2 & O & & S & CH_3 \\ | & \| & & / \backslash & / \\ R_1-C-C-NH-CH-C & & C-CH_3 \\ | & & & | \\ (CH_2)_n & O=C-----CH-COOR_3 \\ | & & \\ R_4O-P\rightarrow O & & \\ | & & \\ OR_5 & & \end{matrix}$$

and the non-toxic cationic salts thereof wherein $R_1$ is selected from the group consisting of hydrogen, lower alkyl, phenyl and substituted phenyl wherein the substituent is selected from the group consisting of chloro, bromo, fluoro, lower alkyl, lower alkoxy and trifluoromethyl;

$R_2$ is hydrogen;

$R_1$ and $R_2$ together with the carbon to which they are attached are selected from the group consisting of alicyclic of from 3 to 7 carbon atoms;

$n$ is an integer from 1 to 8;

$R_3$ is selected from the group consisting of hydrogen and acyloxy lower alkyl wherein the acyloxy moiety is selected from the group consisting of lower alkanoyloxy, benzoyloxy and substituted benzoyloxy wherein the substituent is selected from the group consitsing of chloro, bromo, fluoro, lower alkyl, lower alkoxy and trifluoromethyl;

each of $R_4$ and $R_5$ is selected from the group consisting of hydrogen, lower alkyl, substituted lower alkyl wherein the substituent is selected from the group consisting of lower alkoxy and fluoro; phenyl and substituted phenyl wherein the substituent is selected from the group consisting of chloro, bromo, fluoro, lower alkyl, lower alkoxy and trifluoromethyl.

2. A compound according to claim 1 wherein $R_1$ and $R_2$ together with the carbon to which they are attached are alicyclic, $n$ is 0, $R_3$ is acyloxy lower alkyl and each of $R_4$ and $R_5$ is hydrogen.

3. A compound according to claim 1 wherein $R_1$ is phenyl, each of $R_2$, $R_4$ and $R_5$ is hydrogen, $n$ is 0 and $R_3$ is acyloxy lower alkyl.

4. A compound according to claim 1 wherein $R_1$ is phenyl, $n$ is 1, each of $R_2$ and $R_3$ is hydrogen and each of $R_4$ and $R_5$ is lower alkyl.

5. α-Phosphonobenzylpenicillin, a compound according to claim 1 wherein $R_1$ is phenyl, $n$ is 0 and each of $R_2$, $R_3$, $R_4$ and $R_5$ is hydrogen.

6. α-Phosphonocyclobutylpenicillin, a compound according to claim 1 wherein $R_1$ and $R_2$ together with the carbon to which they are attached are cyclobutyl, $n$ is 0 and each of $R_3$, $R_4$ and $R_5$ is hydrogen.

7. A compound according to claim 2 wherein $R_3$ is benzoyloxymethyl.

8. A compound according to claim 3 wherein $R_3$ is lower alkanoyloxymethyl.

9. Pivaloyloxymethyl α-phosphonobenzylpenicillinate, a compound according to claim 8 wherein $R_1$ is phenyl, each of $R_2$, $R_4$ and $R_5$ is hydrogen, $n$ is 0 and $R_3$ pivaloyloxymethyl.

10. α-Ethyl-n-butyryloxymethyl α-phosphonobenzylpenicillinate, a compound according to claim 8 wherein $R_1$ is phenyl, each of $R_2$, $R_4$ and $R_5$ is hydrogen, $n$ is 0 and $R_3$ is α-ethyl-n-butyryloxymethyl.

11. A compound of the formula

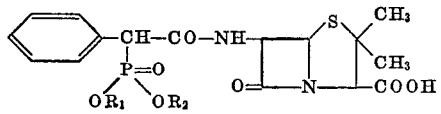

and the non-toxic cationic salts thereof wherein $R_1$ and $R_2$ are hydrogen and lower alkyl.

References Cited
UNITED STATES PATENTS

| | | | |
|---|---|---|---|
| 3,118,878 | 1/1964 | Nayler et al. | 260—239.1 |
| 3,144,444 | 8/1964 | Koe | 260—239.1 |
| 3,558,601 | 1/1971 | Ekström et al. | 260—239.1 |

NICHOLAS S. RIZZO, Primary Examiner

U.S. Cl. X.R.

424—271

UNITED STATES PATENT OFFICE
CERTIFICATE OF CORRECTION

Patent No. 3,828,025           Dated   August 6, 1974

Inventor(s)   Ernest S. Hamanaka

It is certified that error appears in the above-identified patent and that said Letters Patent are hereby corrected as shown below:

Column 2, line 17, "phosphonocyclialkyl" should read
-- phosphonocycloalkyl --.

Column 2, that part of formula I reading

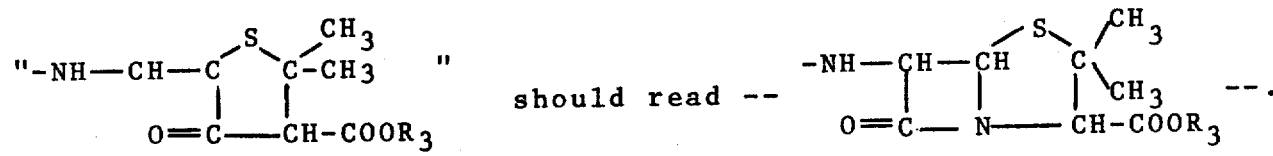

Column 7, Table I, under the heading "α-phosphono-MIC", in line 1 change "1 0" to -- 100 --; in line 2 change "12.0" to -- 12.5 --.

Column 11, under heading "$R_4$" of the Table, line 25, "n-$C_4$H" should read -- n-$C_4H_9$ --; line 27, "n-$C_3H_9$" should read -- n-$C_3H_7$ --.

Column 20, claim 1, that portion of the formula reading

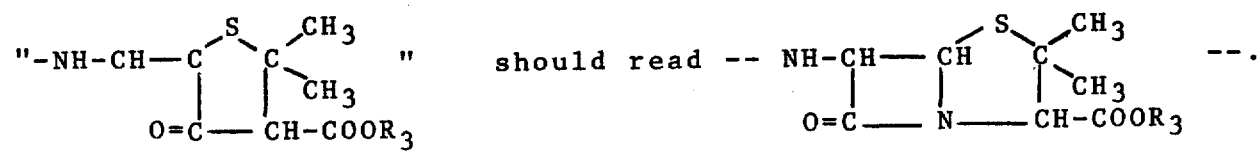

Column 20, claim 1, line 11 under the formula, insert -- O or -- after "is".

Signed and sealed this 19th day of November 1974.

(SEAL)
Attest:

McCOY M. GIBSON JR.
Attesting Officer

C. MARSHALL DANN
Commissioner of Patents